(12) United States Patent
Ji et al.

(10) Patent No.: US 8,285,321 B2
(45) Date of Patent: Oct. 9, 2012

(54) METHOD AND APPARATUS FOR USING VIRTUAL NOISE FIGURE IN A WIRELESS COMMUNICATION NETWORK

(75) Inventors: Tingfang Ji, San Diego, CA (US); Naga Bhushan, San Diego, CA (US); Aamod D. Khandekar, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 12/463,885

(22) Filed: May 11, 2009

(65) Prior Publication Data
US 2009/0286563 A1    Nov. 19, 2009

Related U.S. Application Data

(60) Provisional application No. 61/053,608, filed on May 15, 2008.

(51) Int. Cl.
*H04B 7/00* (2006.01)
(52) U.S. Cl. .......................................... 455/525; 370/331
(58) Field of Classification Search .................. 455/525, 455/436–444, 453, 522, 450, 452.2, 516; 370/331, 318, 329, 332
See application file for complete search history.

(56) References Cited

U.S. PATENT DOCUMENTS

| | | | | |
|---|---|---|---|---|
| 7,936,690 | B2 * | 5/2011 | Willenegger | 370/252 |
| 7,983,674 | B2 * | 7/2011 | Julian et al. | 455/436 |
| 2004/0137908 | A1 | 7/2004 | Sinivaara et al. | |
| 2005/0083888 | A1 | 4/2005 | Smee et al. | |
| 2006/0187873 | A1 | 8/2006 | Friday et al. | |
| 2007/0197251 | A1 | 8/2007 | Das et al. | |

FOREIGN PATENT DOCUMENTS

| | | |
|---|---|---|
| EP | 1156623 A1 | 11/2001 |
| JP | 2002199430 A | 7/2002 |
| JP | 2006509481 A | 3/2006 |
| KR | 20050091075 | 9/2005 |
| WO | WO0074275 A1 | 12/2000 |

(Continued)

OTHER PUBLICATIONS

International Search Report and Written Opinion—PCT/US2009/0442053—Feb. 2, 2012.

(Continued)

*Primary Examiner* — Joseph Lauture
(74) *Attorney, Agent, or Firm* — Florin Corie; Ashish L. Patel

(57) ABSTRACT

Techniques for using virtual noise figure for various functions in a wireless communication network are described. A virtual noise figure is an indication of a virtual noise level at a receiver, which may be higher than an actual noise level at the receiver. In an aspect, virtual noise figure may be used for serving base station selection. A terminal may receive information indicative of a virtual noise figure for each of at least one base station. The terminal may select a serving base station based on the virtual noise figure for each base station. The terminal may send data to the serving base station at a rate selected based on an actual noise figure for the serving base station. In other aspects, virtual noise figure may be used for interference management and/or power control.

58 Claims, 8 Drawing Sheets

FOREIGN PATENT DOCUMENTS

| | | |
|---|---|---|
| WO | WO2006122233 A2 | 11/2006 |
| WO | WO2007078099 A1 | 7/2007 |
| WO | WO2008024816 A1 | 2/2008 |
| WO | WO2008055132 A2 | 5/2008 |
| WO | WO2008058143 A2 | 5/2008 |

OTHER PUBLICATIONS

ISA/EPO—Feb. 10, 2010.
European Search Report—EP12151777—Search Authority—Munich—Feb. 24, 2012.

\* cited by examiner

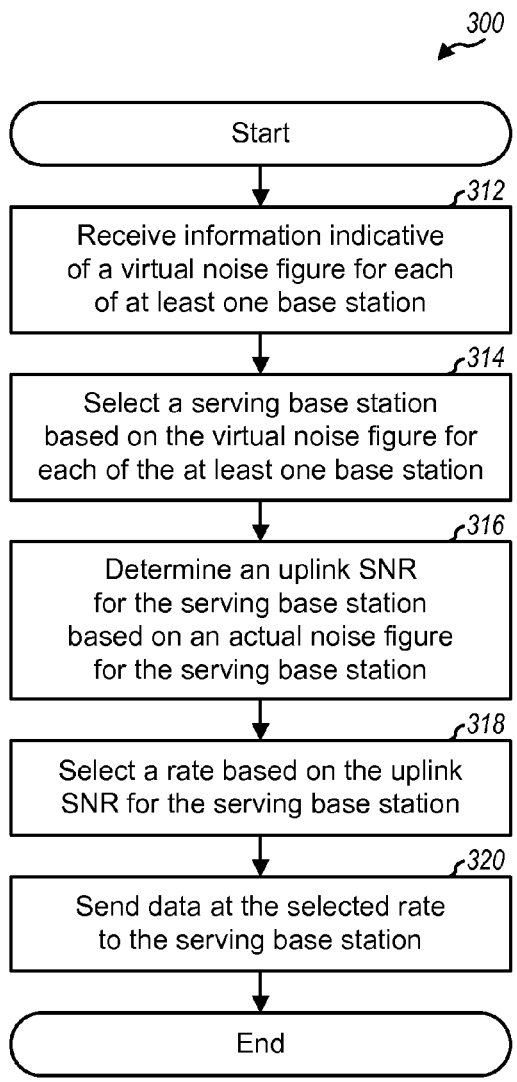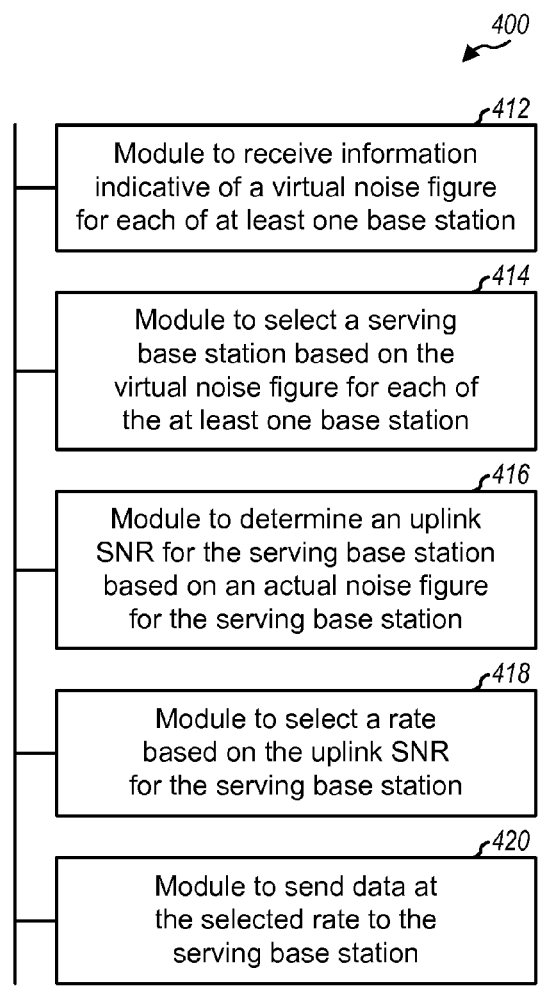
FIG. 3
FIG. 4

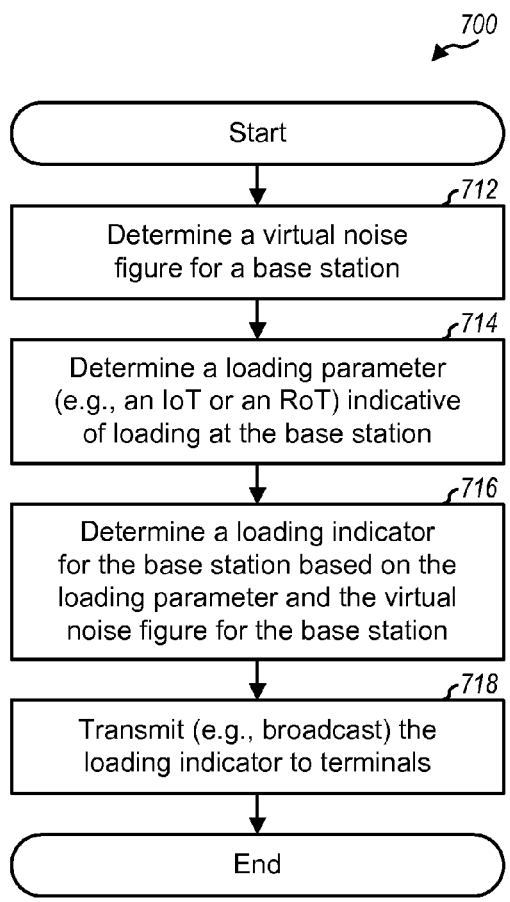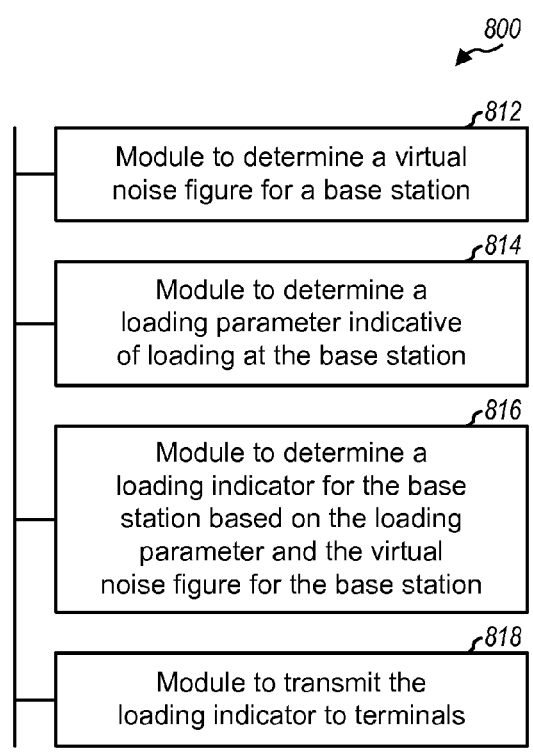
FIG. 7
FIG. 8

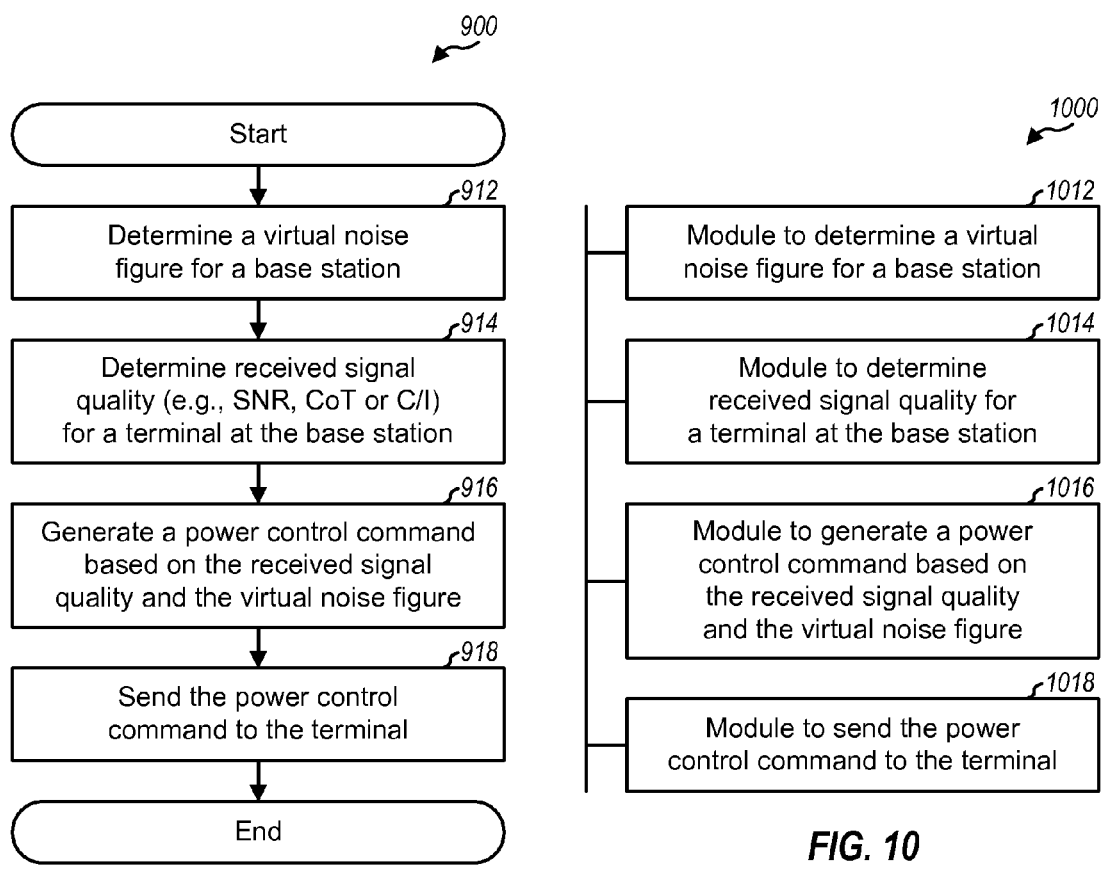

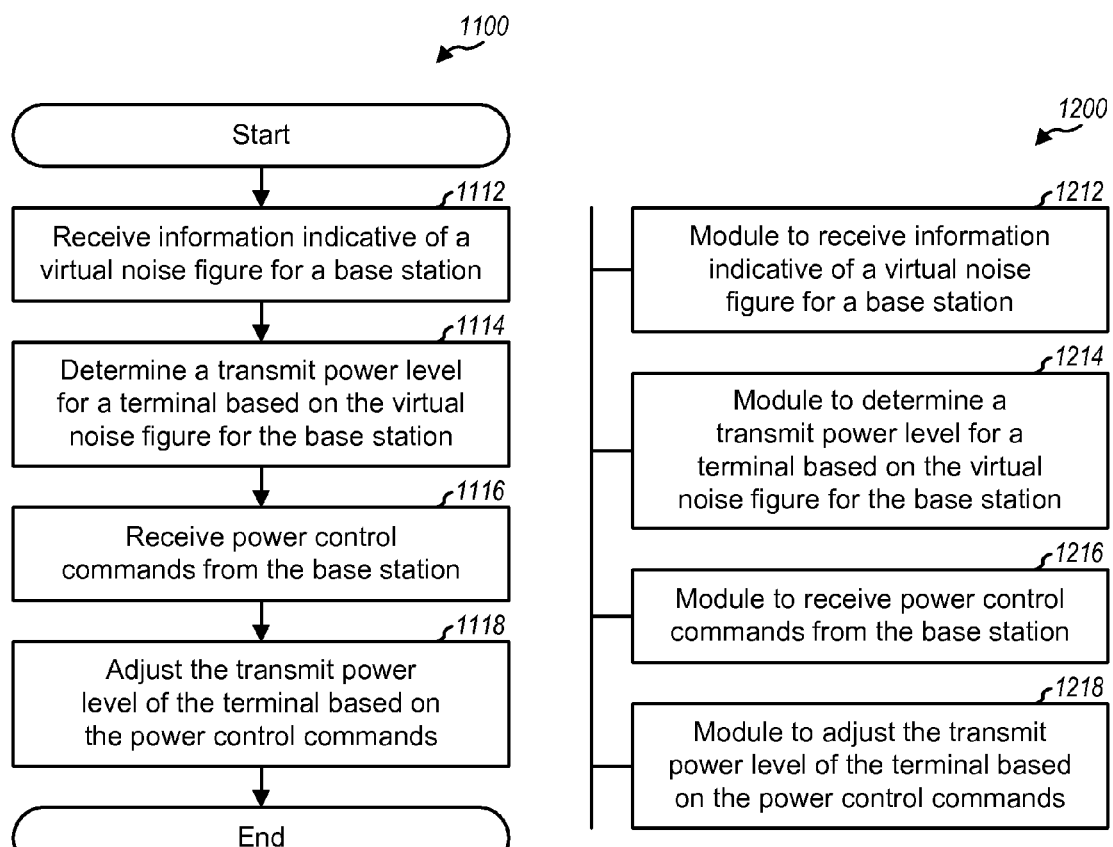

METHOD AND APPARATUS FOR USING VIRTUAL NOISE FIGURE IN A WIRELESS COMMUNICATION NETWORK

The present application claims priority to provisional U.S. Application Ser. No. 61/053,608, entitled "VIRTUAL NOISE FIGURE DEGRADATION IN HETEROGENEOUS NETWORKS," filed May 15, 2008, assigned to the assignee hereof and incorporated herein by reference.

BACKGROUND

I. Field

The present disclosure relates generally to communication, and more specifically to techniques for selecting a serving base station and performing other functions in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of terminals. A terminal may be within the coverage of zero or more base stations at any given moment. If multiple base stations are available, then it is desirable to select a suitable base station to serve the terminal such that good performance can be achieved for the terminal while improving network capacity.

SUMMARY

Techniques for using virtual noise figure for various functions in a wireless communication network are described herein. A virtual noise figure is an indication of a virtual noise level at a receiver and may be given by a ratio of the virtual noise level to thermal noise level. The virtual noise level is a hypothetical noise level that may be higher than an actual noise level at the receiver. The virtual noise figure may be used for various functions and may be especially applicable in a heterogeneous network with base stations having different transmit power levels.

In an aspect, virtual noise figure may be used for selection of a serving base station for a terminal. The terminal may receive information indicative of a virtual noise figure for each of at least one base station. The information indicative of a virtual noise figure may be any information that may be used to determine a virtual noise figure of a base station. Such information may comprise, e.g., a virtual noise figure, an actual noise figure, a noise figure delta, an actual transmit power level, a virtual transmit power level, and/or other parameters for a base station. The virtual noise figure for each base station may be determined based on an actual or virtual transmit power level for that base station, a reference transmit power level, and an actual noise figure for the base station. The terminal may select a serving base station based on the virtual noise figure for each of the at least one base station. In one design, the terminal may determine a downlink received signal strength for each base station. The terminal may also determine an uplink signal-to-noise ratio (SNR) for each base station based on the virtual noise figure for that base station and other information. The terminal may then select the serving base station based on the uplink SNR and the downlink received signal strength for each base station. The terminal may also determine an uplink SNR for the serving base station based on the actual noise figure for the base station. The terminal may then select a rate based on the uplink SNR for the serving base station and may send data at the selected rate to the serving base station.

In another aspect, virtual noise figure may be used for interference management. A base station may determine a parameter indicative of loading at the base station. The parameter may be an interference-over-thermal (IoT), a rise-over-thermal (RoT), etc. The base station may determine a loading indicator based on the parameter indicative of loading at the base station and a virtual noise figure for the base station. In one design, the base station may determine a threshold based on the virtual noise figure, compare the parameter against the threshold, and set the loading indicator based on the comparison result. The base station may transmit (e.g., broadcast) the loading indicator to terminals, which may adjust their transmit power levels based on the loading indicator.

In yet another aspect, virtual noise figure may be used for power control. A base station may determine received signal quality for a terminal. The base station may generate a power control command based on the received signal quality for the terminal and a virtual noise figure for the base station. The base station may send the power control command to the terminal, which may adjust its transmit power level accordingly.

Various aspects and features of the disclosure are described in further detail below.

BRIEF DESCRIPTION OF THE DRAWINGS

FIG. 3 shows a process for selecting a serving base station.

FIG. 4 shows an apparatus for selecting a serving base station.

FIG. 7 shows a process for performing interference management.

FIG. 8 shows an apparatus for performing interference management.

FIG. 9 shows a process for performing power control by a base station.

FIG. 10 shows an apparatus for performing power control by a base station.

FIG. 11 shows a process for performing power control by a terminal.

FIG. 12 shows an apparatus for performing power control by a terminal.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
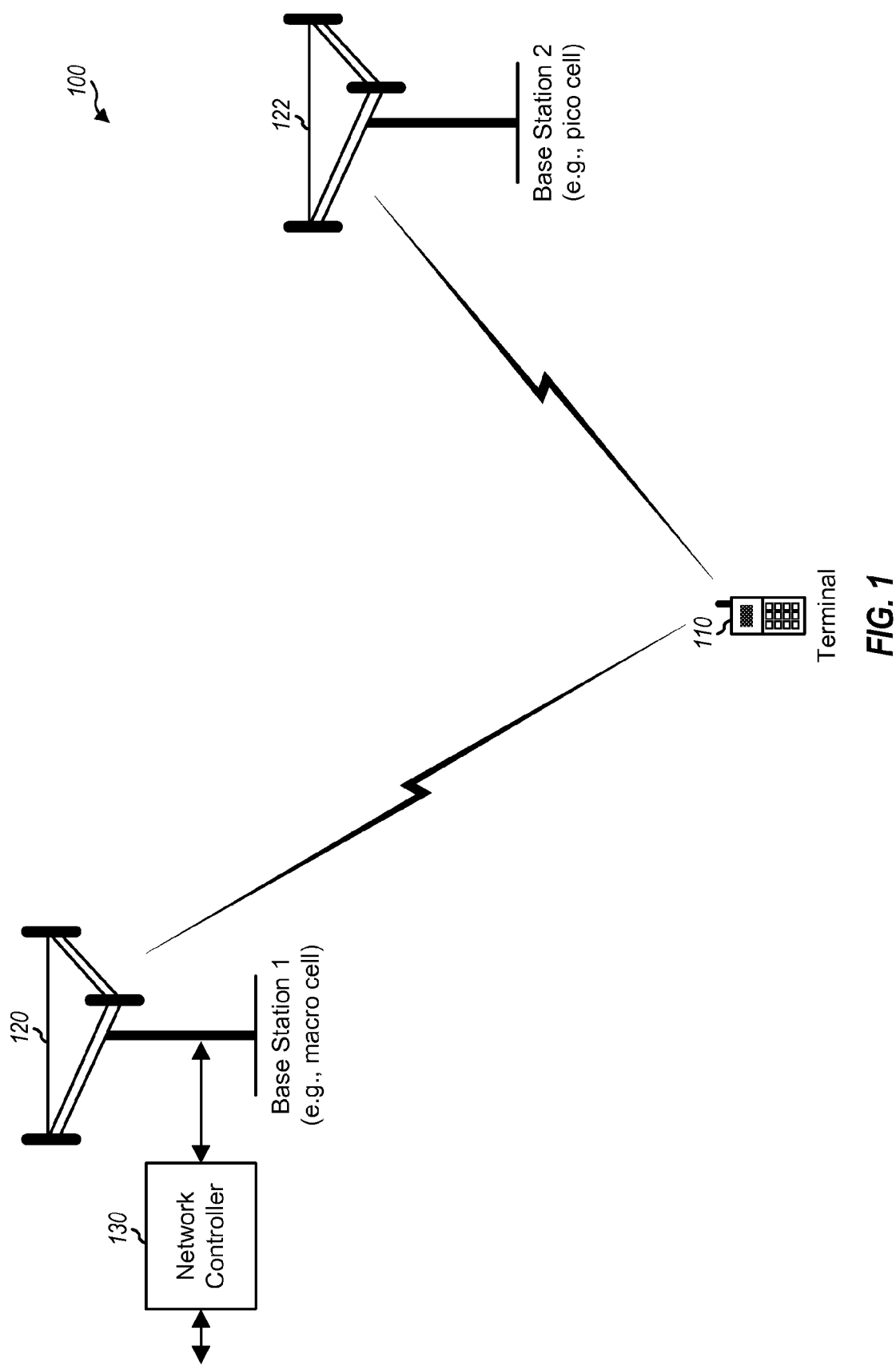
FIG. 1 shows a wireless communication network.

FIG. 1 shows a wireless communication network 100, which may include a number of base stations and other network entities. For simplicity, only two base stations 120 and 122 and one network controller 130 are shown in FIG. 1. A base station may be a station that communicates with the terminals and may also be referred to as an access point, a Node B, an evolved Node B (eNB), etc. A base station may provide communication coverage for a particular geographic area. The term "cell" can refer to a coverage area of a base station and/or a base station subsystem serving this coverage area, depending on the context in which the term is used. A base station may serve one or multiple (e.g., three) cells.

A base station may provide communication coverage for a macro cell, a pico cell, a femto cell, or some other type of cell. A macro cell may cover a relatively large geographic area (e.g., several kilometers in radius) and may support communication for terminals with service subscription. A pico cell may cover a relatively small geographic area and may support communication for all terminals with service subscription. A femto cell may cover a relatively small geographic area (e.g., a home) and may support communication for terminals having association with the femto cell (e.g., terminals belonging to residents of the home). A base station for a macro cell may be referred to as a macro base station. A base station for a pico cell may be referred to as a pico base station. A base station for a femto cell may be referred to as a home base station. A serving base station is a base station designated to serve a terminal on the downlink and/or uplink.

Network controller 130 may couple to a set of base stations and provide coordination and control for these base stations. Network controller 130 may communicate with base stations 120 and 122 via a backhaul. Base stations 120 and 122 may also communicate with one another, e.g., directly or indirectly via wireless or wireline backhaul.

A terminal 110 may be one of many terminals supported by wireless network 100. Terminal 110 may be stationary or mobile and may also be referred to as an access terminal (AT), a mobile station (MS), a user equipment (UE), a subscriber unit, a station, etc. Terminal 110 may be a cellular phone, a personal digital assistant (PDA), a wireless modem, a wireless communication device, a handheld device, a laptop computer, a cordless phone, etc. Terminal 110 may communicate with a base station via the downlink and uplink. The downlink (or forward link) refers to the communication link from the base station to the terminal, and the uplink (or reverse link) refers to the communication link from the terminal to the base station.

In wireless network 100, a serving base station may be selected for a terminal during handoff or initial access based on downlink and uplink received signal strength (RSS) measurements. Received signal strength may also be referred to as received power, received pilot power, pilot strength, etc. If base stations 120 and 122 have equal transmit power for the downlink and if terminal 110 measures higher received signal strength for base station 120, then base station 120 may be selected as the serving base station for terminal 110. If the downlink path loss is equal to the uplink path loss, then higher downlink received signal strength for base station 120 at terminal 110 may imply higher uplink received signal strength for terminal 110 at base station 120. In this case, selecting a serving base station based on downlink received signal strength will also result in good uplink performance.

A heterogeneous network may include base stations with different transmit power levels. For example, a macro base station may have a transmit power level of +43 dBm (decibel relative to one milliWatt) whereas a home base station may have a transmit power level of +30 dBm. A terminal may be within the coverage of two base stations. The boundary at which the downlink received signal strength for one base station is equal to the downlink received signal strength for the other base station is referred to as the downlink handoff boundary. The boundary at which the uplink received signal strength at one base station is equal to the uplink received signal strength at the other base station is referred to as the uplink handoff boundary. If the two base stations have different transmit power levels, then the downlink handoff boundary may not match the uplink handoff boundary. The terminal may then have higher downlink received signal strength for one base station but higher uplink received signal strength at the other base station. For example, the terminal may measure −90 dBm for a macro base station transmitting at +43 dBm and −95 dBm for a home base station transmitting at +30 dBm. The path loss for the macro base station may be 133 decibel (dB), and the path loss for the home base station may be 125 dB. The uplink received signal strength for the terminal may be 8 dB higher at the home base station than the macro base station. The macro base station with the better downlink may be selected as the serving base station for the terminal. However, the terminal may be closer to the home base station, which is a non-serving base station, and may have better uplink for the home base station.

The difference in transmit power levels for two base stations may be expressed as:

$$\Delta_{TX} = P_{TX,high} - P_{TX,low}, \quad \text{Eq (1)}$$

where $P_{TX,high}$ is a transmit power level (in dBm) for a high power base station, $P_{TX,low}$ is a transmit power level (in dBm) for a low power base station, and $\Delta_{TX}$ is a downlink transmit power difference (in dB) for the two base stations.

The boundaries of equal received signal strength for/at the two base stations may be offset by the downlink transmit power difference $\Delta_{TX}$. One scheme to balance the downlink and uplink handoff boundaries is to apply noise figure degradation at the low power base station. Noise figure is a ratio of received noise to thermal noise (in linear unit). As an example, with no radio frequency (RF) input, the thermal noise may be −174 dBm/Hz at 0° Kelvin, the received noise may be −169 dBm/Hz, and the noise figure may be 5 dB. For noise figure degradation, the low power base station may generate and add noise such that its noise figure is $\Delta_{TX}$ dB higher, as follows:

$$NF_{low} = NF_{high} + \Delta_{TX}, \quad\quad\quad Eq(2)$$

where $NF_{high}$ is the noise figure (in dB) for the high power base station, and $NF_{low}$ is the noise figure (in dB) for the low power base station.

For the example described above with $\Delta_{TX}$=13 dB between the high and low power base stations, the low power base station may generate and add noise to increase the noise level from −169 dBm/Hz to −156 dBm/Hz. The noise figure for the low power base station may then be increased by 13 dB.

Noise figure degradation may be used to balance the downlink and uplink handoff boundaries for base stations with different transmit power levels. Many uplink power control and interference management schemes control the signal and interference levels to a few times the thermal noise level. In case of transmit power mismatch between base stations, increasing the noise figure of the low power base station by $\Delta_{TX}$ dB may result in matching the downlink and uplink handoff boundaries for the high and low power base stations. For example, the high power base station may transmit at +43 dBm, and the low power base station may transmit at +30 dBm. A terminal may measure −90 dBm for both base stations. The terminal may have a path loss of 133 dB for the high power base station and a path loss of 120 dB for the low power base station. The low power base station may have 13 dB higher received signal strength for the terminal than the high power base station. However, if the low power base station has 13 dB higher noise figure, then both base stations may have the same SNR for the terminal. With noise figure degradation, the terminal may have the same downlink SNR for both base stations when located at the handoff boundary and may also have the same uplink SNR at both base stations at the same handoff boundary. The base station with the best downlink may be selected as the serving base station, and this base station would also have the best uplink for the terminal (assuming that the path loss for the downlink is equal to the path loss for the uplink). Noise figure degradation may thus be used to balance the downlink and uplink handoff boundaries. However, the extra noise added at the low power base station may result in loss of uplink capacity and may also degrade uplink performance.

In an aspect, virtual noise figure may be used for serving base station selection in a heterogeneous network to obtain balanced downlink and uplink handoff boundaries while avoiding uplink performance degradation. An actual noise figure of a base station may be virtually degraded by a suitable amount to obtain a virtual noise figure for the base station. However, the noise figure of the base station is not actually degraded by injecting extra noise. Hence, degradation in uplink performance may be avoided. The virtual noise figure may be used for serving base station selection and/or other purposes.

The actual and virtual noise figures for a given base station m may be expressed as:

$$NF_{actual,m} = N_{actual,m} - N_0, \quad\quad\quad Eq(3)$$

$$NF_{virtual,m} = NF_{actual,m} + \delta_{NF,m}, \text{ and} \quad\quad\quad Eq(4)$$

$$\delta_{NF,m} = NF_{virtual,m} - NF_{actual,m} \quad\quad\quad Eq(5)$$

where $N_0$ is thermal noise (in dBm) for an applicable bandwidth, $N_{actual,m}$ is actual noise (in dBm) for base station m, $NF_{actual,m}$ is the actual noise figure (in dB) for base station m, $NF_{virtual,m}$ is the virtual noise figure (in dB) for base station m, and $\delta_{NF,m}$ is a delta between the virtual and actual noise figures for base station m.

For simplicity, noise may be defined for an applicable bandwidth (e.g., the bandwidth usable for transmission) and given in units of dBm. Noise may also be provided as a density and given in units of dBm/Hz.

In one design, the noise figure delta $\delta_{NF,m}$ may be defined as follows:

$$\delta_{NF,m} = P_{TX,ref} - P_{TX,m}, \quad\quad\quad Eq(6)$$

where $P_{TX,ref}$ is a reference transmit power level, and $P_{TX,m}$ is the transmit power level for base station m.

The reference transmit power level may be the transmit power level for a macro base station, a predetermined transmit power level, etc.

In general, the noise figure delta $\delta_{NF,m}$ may be set to any suitable value equal to or greater than zero. If $\delta_{NF,m} = \Delta_{TX}$, then the downlink and uplink handoff boundaries may be balanced. $\delta_{NF,m}$ may also be set to other values to favor selection of certain base stations. For example, $\delta_{NF,m}$ may be set as $0 \leq \delta_{NF,m} < \Delta_{TX}$ to favor selection of home base stations over macro base stations. The virtual noise figure may be computed based on the noise figure delta and the actual noise figure, as shown in equation (4).

The path loss for base station m at a terminal may be expressed as:

$$PL_m = P_{TX,m} - P_{RX,m}, \quad\quad\quad Eq(7)$$

where $P_{Rx,m}$ is the received power for base station m at the terminal, and $PL_m$ is the path loss for base station m.

$P_{RX,m}$ is also referred to as the downlink received signal strength for base station m.

The downlink SNR for base station m at the terminal may be expressed as:

$$SNR_{DL,m} = P_{Rx,m} - N_{terminal}, \quad\quad\quad Eq(8)$$

where $N_{terminal}$ is noise (in dBm) at the terminal, and $SNR_{DL,m}$ is the downlink SNR for base station m.

The uplink SNR for the terminal at base station m may be expressed as:

$$SNR_{UL,m} = P_{TX,terminal} - PL_m - (N_0 + NF_{virtual,m}), \quad\quad\quad Eq(9)$$

where $P_{TX,terminal}$ is the transmit power level for the terminal, and $SNR_{UL,m}$ is the uplink SNR for the terminal at base station m.

Equation (9) assumes that the path loss for the uplink is equal to the path loss for the downlink.

Figure 2A:
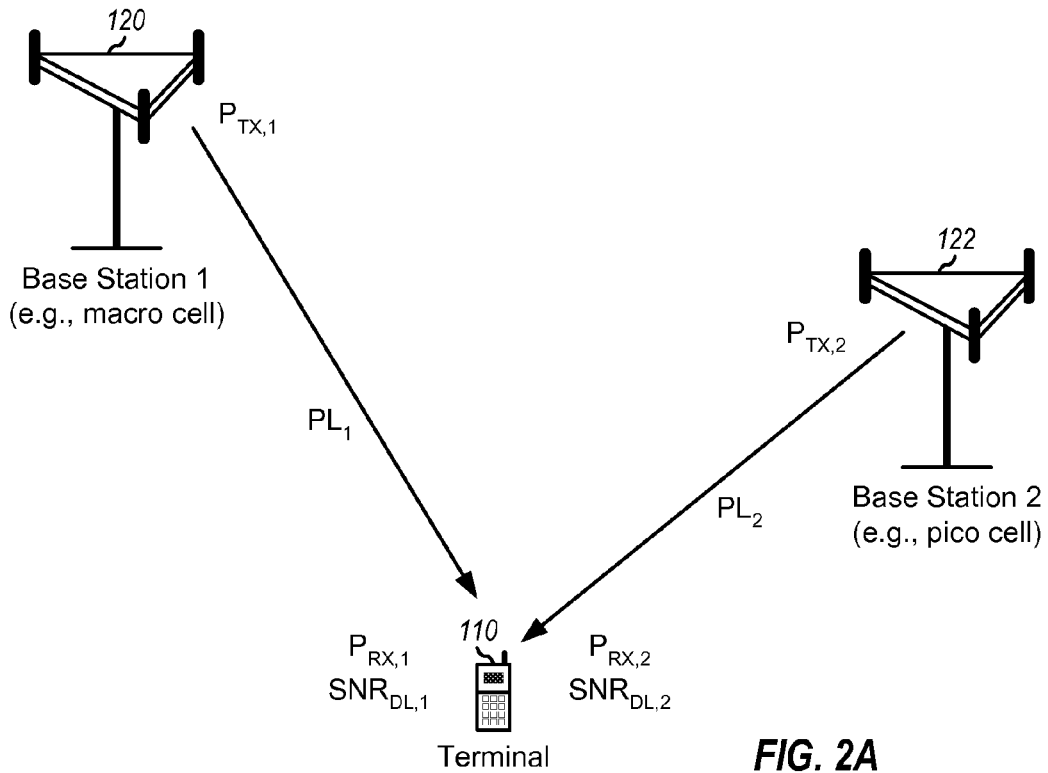
FIG. 2A shows downlink transmissions from two base stations.

FIG. 2A shows downlink transmissions from base stations 120 and 122 to terminal 110. Base stations 120 and 122 may have transmit power levels of $P_{TX,1}$ and $P_{TX,2}$, respectively, and may also have path losses of $PL_1$ and $PL_2$, respectively, to terminal 110. Terminal 110 may obtain received powers of $P_{RX,1}$ and $P_{RX,2}$ for base stations 120 and 122, respectively. Terminal 110 may compute downlink SNRs of $SNR_{DL,1}$ and $SNR_{DL,2}$ for base stations 120 and 122, respectively.

Figure 2B:
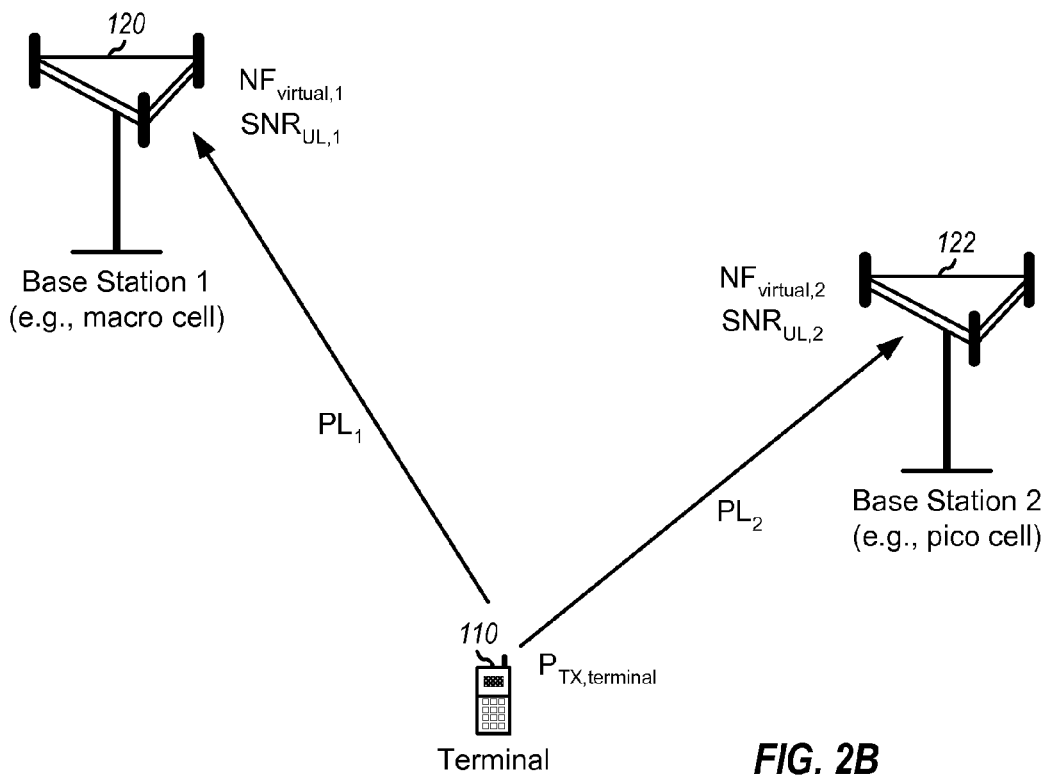
FIG. 2B shows uplink transmissions to two base stations.

FIG. 2B shows uplink transmissions from terminal 110 to base stations 120 and 122. Terminal 110 may have a transmit power level of $P_{TX,terminal}$ and may also have path losses of $PL_1$ and $PL_2$, respectively, to base stations 120 and 122, respectively. Base stations 120 and 122 may have virtual noise figures of $NF_{virtual,1}$ and $NF_{virtual,2}$, respectively. Terminal 110 may have uplink SNRs of $SNR_{UL,1}$ and $SNR_{UL,2}$ at base stations 120 and 122, respectively, which may be obtained based on the virtual noise figures of $NF_{virtual,1}$ and $NF_{virtual,2}$, respectively.

Each base station may send various types of information that may be used for serving base station selection and/or other purposes. For example, each base station may broadcast its transmit power level $P_{TX,m}$, its actual noise figure $NF_{actual,m}$, its virtual noise figure $NF_{virtual,m}$, its noise figure delta $\delta_{NF,m}$, other information, or any combination thereof. The transmit power level $P_{TX,m}$ may also be known by the terminals a priori or conveyed in other manners. The virtual noise figure $NF_{virtual,m}$ may be conveyed by an absolute value, a relative value from the actual noise figure (e.g., $\delta_{NF,m}$), a relative value from a nominal noise figure, etc. The virtual noise figure may also be conveyed by the actual noise figure $NF_{actual,m}$ and the transmit power level $P_{TX,m}$, which may be used to compute the noise figure delta $\delta_{NF,m}$ based on a known reference transmit power level $P_{TX,ref}$.

In one design, a terminal may receive broadcast information from base stations and may compute various measurements for each base station. The terminal may measure the downlink received signal strength for each base station. The terminal may determine the path loss for each base station based on the transmit power level and the measured downlink received signal strength for that base station. The terminal may compute the downlink SNR for each base station, e.g., as shown in equation (8). The terminal may also compute the uplink SNR for each base station based on the virtual noise figure for that base station, e.g., as shown in equation (9). The terminal may select a serving base station based on the downlink SNR, the uplink SNR, and/or other information for all candidate base stations.

In another design, a base station may select a serving base station for a terminal. In this design, the base station may not transmit a virtual noise figure but may use it internally in its own calculation to make a decision regarding a serving base station for the terminal. The base station may use other information, such as downlink SNR reported by the terminal, in making the decision.

The serving base station may be selected in various manners. In one design, the base station with the best downlink (e.g., the highest downlink SNR) may be selected, with a constraint that the uplink of the selected base station is above a predetermined threshold or is within a predetermined range of the best uplink. This design may be used to improve downlink performance for the terminal. In another design, the base station with the best uplink (e.g., the highest uplink SNR) may be selected, with a constraint that the downlink of the selected base station is above a predetermined threshold or is within a predetermined range of the best downlink. This design may be used if uplink capacity is limited. In general, the serving base station may be selected based on one or more criteria, which may be defined based on a tradeoff between downlink and uplink performance.

The uplink SNR in equation (9) is a virtual SNR obtained based on the virtual noise figure, which is higher than the actual noise figure by $\delta_{NF,m}$. The virtual SNR may be used for serving base station selection. An actual SNR for the uplink may be determined based on the actual noise figure and may be expressed as:

$$SNR_{UL,actual,m} = P_{TX,terminal} - PL_m - (N_0 + NF_{actual,m}), \quad \text{Eq (10)}$$

where $SNR_{UL,actual,m}$ is the actual uplink SNR, which is based on the actual noise figure for base station m.

In one design, a data rate may be selected based on the actual SNR and a look-up table of data rate versus SNR. Data may be sent at the data rate determined based on the actual SNR. This design may result in better utilization of the available channel capacity. In another design, a data rate may be selected based on a virtual SNR obtained with the virtual noise figure. Data may be sent at the data rate determined based on the virtual SNR. If hybrid automatic retransmission (HARQ) is used for data transmission, then the data transmission may terminate early since the actual SNR may be better than the virtual SNR. In yet another design, an intermediate SNR may be computed based on an intermediate noise figure, which may be selected based on a tradeoff between capacity and reliability and may be given as $NF_{actual,m} < NF_{intermediate,m} < NF_{virtual,m}$. Data may be sent at a data rate determined based on the intermediate SNR.

In another aspect, virtual noise figure may be used for interference management in a heterogeneous network. The network may utilize OFDM or SC-FDM. In this case, a base station may determine a virtual IoT, which may be expressed as:

$$IoT_{virtual,m} = I_m - N_{virtual,m} = I_m - (N_{actual,m} + \delta_{NF,m}) = I_m - (N_0 + NF_{virtual,m}), \quad \text{Eq (11)}$$

where $I_m$ is the measured interference (in dBm) at base station m,
$N_{virtual,m}$ is virtual noise (in dBm) at base station m, and
$IoT_{virtual,m}$ is the virtual IoT (in dB) for base station m.

The base station may measure interference power $I_m$ and noise power $N_{actual,m}$ observed by the base station. In the design shown in equation (11), the base station may determine the virtual noise power based on the measured/actual noise power and the noise figure delta $\delta_{NF,m}$, which may be dependent on the transmit power of the base station, e.g., as shown in equation (6). The base station may then determine the virtual IoT based on the measured interference and the virtual noise power. The base station may compare the virtual IoT against an IoT threshold and may set an overload indicator if the virtual IoT exceeds the IoT threshold, as follows:

IF $(IoT_{virtual,m} > IoT_{th})$
 THEN overload indicator='1',
 ELSE overload indicator='0'.

The overload indicator may also be referred to as a loading indicator, an other sector interference (OSI) indicator, an other cell interference indicator, etc. The overload indicator may comprise one bit (as shown above) or multiple bits.

In another design, the base station may determine an actual IoT based on the measured interference and the actual noise power, as follows:

$$IoT_{actual,m} = I_m - N_{actual,m} = I_m - (N_0 + NF_{actual,m}), \quad \text{Eq (12)}$$

where $IoT_{actual,m}$ is the actual IoT (in dB) for base station m. The base station may compare the actual IoT against a virtual IoT threshold, which may be determined based on the noise figure delta $\delta_{NF,m}$, as follows:

$$IoT_{virtual,th} = IoT_{nom,th} + \delta_{NF,m} = IoT_{nom,th} + (NF_{virtual,m} - NF_{actual,m}), \quad \text{Eq (13)}$$

where $IoT_{nom,th}$ is a nominal IoT threshold, and $IoT_{virtual,th}$ is the virtual IoT threshold. The nominal IoT threshold may be an IoT threshold for a macro base station and may be equal to 6 to 7 dB. The base station may set an overload indicator if the actual IoT exceeds the virtual IoT threshold.

For both designs, the use of the virtual noise figure may result in the base station operating at a smaller actual IoT, which may provide more margin against system instability. The base station may broadcast the overload indicator to terminals. Terminals in neighbor cells may reduce their transmit power if the overload indicator indicates high IoT at the base station.

The network may utilize CDMA. In this case, a base station may determine a virtual RoT, which may be expressed as:

$$RoT_{virtual,m} = P_{RX,m} - N_{virtual,m} = P_{RX,m} - (N_0 + NF_{virtual,m}), \quad \text{Eq (14)}$$

where $RoT_{virtual,m}$ is the virtual RoT (in dB) for base station m.

The base station may measure the received power $P_{RX,m}$ and the noise power $N_{actual,m}$ at the base station. The base station may determine the virtual noise power based on the measured/actual noise power and the noise figure delta $\delta_{NF,m}$. The base station may then determine the virtual RoT based on the received power and the virtual noise power. The base station may compare the virtual RoT against an RoT threshold and may set an overload indicator if the virtual RoT exceeds the RoT threshold, as follows:

IF ($RoT_{virtual,m} > RoT_{th}$)
  THEN overload indicator='1',
  ELSE overload indicator='0'.

In another design, the base station may determine an actual RoT based on the received power and the actual noise power. The base station may then compare the actual RoT against a virtual RoT threshold, which may be determined based on the noise figure delta $\delta_{NF,m}$. The base station may set an overload indicator if the actual RoT exceeds the virtual RoT threshold.

In general, the virtual noise figure for the base station may be taken into account in either an interference parameter (e.g., the virtual IoT or the virtual RoT) or a corresponding threshold (e.g., the virtual IoT threshold or the virtual RoT threshold). In any case, the base station may broadcast the overload indicator to terminals. The terminals in neighbor cells may reduce their transmit power if the overload indicator indicates high IoT or high RoT at the base station.

In yet another aspect, virtual noise figure may be used for power control in a heterogeneous network. The received signal quality for a transmission may be given by SNR, carrier-over-thermal (CoT), carrier-to-interference ratio (C/I), or some other quantity. SNR, CoT and C/I may be expressed as:

$$SNR_{actual,m} = P_{RX,m} - N_{actual,m} = P_{RX,m} - (N_0 + NF_{actual,m}), \quad \text{Eq (15)}$$

$$CoT_{actual,m} = C_m - N_{actual,m} = C_m - (N_0 + NF_{actual,m}), \quad \text{Eq (16)}$$

$$C/I_{actual,m} = C_m - (I_m + N_{actual,m}) = C_m - (I_m + N_0 + NF_{actual,m}), \quad \text{Eq (17)}$$

where $C_m$ is the received carrier power (in dBm) for a terminal at base station m, $SNR_{actual,m}$ is the actual SNR (in dB) for the terminal at base station m, $CoT_{actual,m}$ is the actual CoT (in dB) for the terminal at base station m, and $C/I_{actual,m}$ is the actual C/I (in dB) for the terminal at base station m.

The actual SNR, CoT or C/I may be compared against a virtual SNR, CoT or C/I threshold, respectively. These thresholds may be expressed as:

$$SNR_{virtual,th} = SNR_{nom,th} + \delta_{NF,m} = SNR_{nom,th} + (NF_{virtual,m} - NF_{actual,m}), \quad \text{Eq (18)}$$

$$CoT_{virtual,th} = CoT_{nom,th} + \delta_{NF,m} = CoT_{nom,th} + (NF_{virtual,m} - NF_{actual,m}), \quad \text{Eq (19)}$$

$$C/I_{virtual,th} = C/I_{nom,th} + \delta_{NF,m} = C/I_{nom,th} + (NF_{virtual,m} - NF_{actual,m}), \quad \text{Eq (20)}$$

where $SNR_{nom,th}$ is a nominal SNR threshold and $SNR_{virtual,th}$ is a virtual SNR threshold, $CoT_{nom,th}$ is a nominal CoT threshold and $CoT_{virtual,th}$ is a virtual CoT threshold, and $C/I_{nom,th}$ is a nominal C/I threshold and $C/I_{virtual,th}$ is a virtual C/I threshold.

The nominal SNR, CoT and C/I thresholds may be suitably selected values. The virtual SNR, CoT and C/I thresholds may be higher than the nominal SNR, CoT and C/I thresholds, respectively, by the noise figure delta $\delta_{NF,m}$.

A base station may determine the actual SNR, CoT or C/I for a terminal based on the actual noise power, e.g., as shown in equation (15), (16) or (17). The base station may compare the actual SNR, CoT or C/I against the virtual SNR, CoT or C/I threshold, and may generate a power control command as follows:

IF ($SNR_{actual,m} < SNR_{virtual,th}$) or ($CoT_{actual,m} < CoT_{virtual,th}$) or ($C/I_{actual,m} < C/I_{virtual,th}$)
  THEN power control command=UP command,
  ELSE power control command=DOWN command.

In another design, the base station may determine a virtual SNR, CoT or C/I based on the virtual noise figure $NF_{virtual,m}$. The base station may then compare the virtual SNR, CoT or C/I against the nominal SNR, CoT or C/I threshold. In general, the virtual noise figure may be taken into account in either the received signal quality (e.g., the virtual SNR, CoT or C/I) or the corresponding threshold (e.g., the virtual SNR, CoT or C/I threshold). In any case, the base station may send the power control command to the terminal. The terminal may increase its transmit power if an UP command is received or decrease its transmit power if a DOWN command is received.

The terminal may set its transmit power level based on noise figure degradation for the serving base station. In one design, the terminal may set its transmit power as follows:

$$P_{TX1} = P_{TX2} + \Delta_{12} + \delta_{NF,m}, \quad \text{Eq (21)}$$

where $P_{TX1}$ is a transmit power level (in dBm) for a first channel, $P_{TX2}$ is a transmit power level (in dBm) for a second channel, $\Delta_{12}$ is a nominal power offset (in dB) between the first and second channels, and $\delta_{NF,m}$ is a noise figure based adjustment (in dB).

The first channel may be a pilot channel, a control channel, a traffic channel, etc. The second channel may be an access channel, a pilot channel, etc. The transmit power level $P_{TX2}$ may be for the last access probe sent on the access channel or some other transmit power level for some other channel. The nominal power offset $\Delta_{12}$ may be a fixed value that may be known to the terminal or sent by the base station to the terminal. The noise figure based adjustment $\delta_{NF,m}$ may be determined based on information received from base station m. The overall offset between the first and second channels may be given as $\Delta_{12} + \delta_{NF,m}$.

The terminal may receive the virtual noise figure or a change in the virtual noise figure from the serving base station. The terminal may adjust its transmit power level based on the change in the virtual noise figure. For example, the terminal may increase its transmit power level if the virtual noise figure for the base station is degraded, e.g., the change is positive. The terminal may decrease its transmit power level if the virtual noise figure for the base station is improved, e.g., the change is negative.

Virtual noise figure may be used for serving base station selection, interference management, and power control as described above. Virtual noise figure may also be used for other purposes for wireless communication.

In one design, a base station may advertise a virtual transmit power level for the base station. A virtual transmit power level is a hypothetical transmit power level that may be different from (e.g., higher than) an actual transmit power level at a transmitter. The virtual transmit power level may reflect a virtual noise figure at the base station. In one design, the virtual transmit power level and a noise figure delta for the base station may given as follows:

$$P_{TX\_virtual,m} = P_{TX\_actual,m} + \delta_{NF,m}, \quad \text{Eq (22)}$$

$$\delta_{NF,m} = P_{TX\_virtual,m} - P_{TX\_actual,m}, \quad \text{Eq (23)}$$

where $P_{TX\_actual,m}$ is the actual transmit power level of base station m, and $P_{TX\_virtual,m}$ is the virtual transmit power level of base station m.

As shown in equation (22), the base station may have an actual transmit power level of $P_{TX\_actual,m}$ (in units of dBm) and a noise figure delta of $\delta_{NF,m}$ (in units of dB). The base station may advertise (e.g., to terminals and/or other base stations) a virtual transmit power level of $P_{TX\_virtual,m}$ (in units of dBm) instead of the noise figure delta. The virtual transmit power level may be equivalent to the noise figure delta and may be useful in a system that does not support explicit advertisement of noise figure information.

In another design, a base station with an actual transmit power level of $P_{TX\_actual,m}$ and a noise figure delta of $\delta_{NF,m}$ may advertise a virtual transmit power level of $P_{TX\_actual,m}$+x and/or a virtual noise figure delta of ($\delta_{NF,m}$−x), for a suitable offset value of x. The case of x=$\delta_{NF,m}$ may be applicable if (i) the base station advertises a noise figure degradation of zero or (ii) the base station does not have capability to advertise any noise figure degradation and it is assumed to be zero by default. Adjustments of the advertised transmit power level and noise figure degradation by a factor of x dB may be allowed because they do not affect calculations related to serving cell selection, uplink SINR estimation (for the serving cell), and uplink loading parameter (IoT, RoT, etc.) estimation (for non-serving cells) based on measured SNR of a received downlink signal.

FIG. 3 shows a design of a process 300 for selecting a serving base station in a wireless communication network, e.g., a heterogeneous network with base stations having different transmit power levels. Process 300 may be performed by a terminal or some other entity. Information indicative of a virtual noise figure for each of at least one base station may be received (block 312). This information may comprise, e.g., the virtual noise figure, a change in the virtual noise figure, an actual noise figure, a noise figure delta, an actual transmit power level, a virtual transmit power level, etc. For each base station, the virtual noise figure may be equal to or higher than the actual noise figure. The actual and virtual noise figures may be provided in various forms, as described above. For example, a virtual noise figure may be determined based on (i) an actual noise figure and a noise figure delta, as shown in equation (4), (ii) a virtual transmit power level and an actual transmit power level, as shown in equation (23), or (iii) some other information.

A serving base station may be selected based on the virtual noise figure for each of the at least one base station (block 314). In one design, downlink received signal strength for each base station may be determined. An uplink SNR for each base station may also be determined based on the virtual noise figure for that base station and other information. The serving base station may then be selected based on the uplink SNR and the downlink received signal strength for each of the at least one base station. In one design, the base station with the highest downlink received signal strength and an uplink SNR that is above an SNR threshold may be selected as the serving base station. The SNR threshold may be a predetermined absolute value or a relative value that is a predetermined distance from the highest uplink SNR. In another design, the base station with the highest uplink SNR and a downlink received signal strength that is above a signal strength threshold may be selected as the serving base station. The signal strength threshold may be a predetermined absolute value or a relative value that is a predetermined distance from the highest downlink received signal strength. The serving base station may also be selected based on other criteria.

An uplink SNR for the serving base station may be determined based on the actual noise figure for the serving base station (block 316). A rate may be selected based on the uplink SNR for the serving base station (block 318). Data may be sent at the selected rate to the serving base station (block 320).

The serving base station may be selected by the terminal based on information obtained by the terminal, e.g., received from base stations and/or measured by the terminal. Alternatively, the terminal may send pertinent information to a base station, which may then select the serving base station for the terminal.

FIG. 4 shows a design of an apparatus 400 for selecting a serving base station. Apparatus 400 includes a module 412 to receive information indicative of a virtual noise figure for each of at least one base station, a module 414 to select a serving base station based on the virtual noise figure for each of the at least one base station, a module 416 to determine an uplink SNR for the serving base station based on an actual noise figure for the serving base station, a module 418 to select a rate based on the uplink SNR for the serving base station, and a module 420 to send data at the selected rate to the serving base station.

Figure 5:
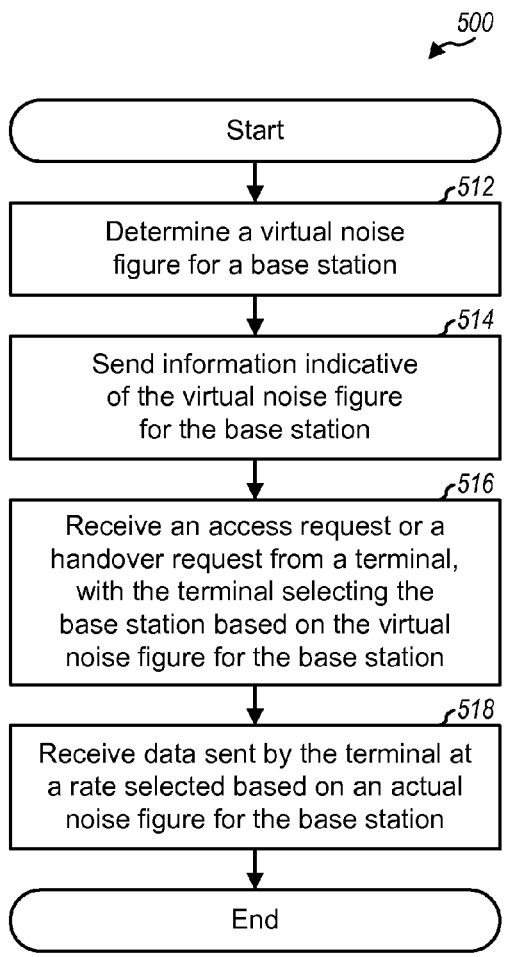
FIG. 5 shows a process for supporting serving base station selection.

FIG. 5 shows a design of a process 500 for supporting serving base station selection in a wireless (e.g., heterogeneous) communication network. Process 500 may be performed by a base station or some other entity. A virtual noise figure for a base station may be determined, e.g., based on a transmit power level for the base station, a reference transmit power level, and an actual noise figure for the base station, as shown in equations (4) and (6) (block 512). Information indicative of the virtual noise figure for the base station may be sent (block 514). An access request or a handoff request may be received from a terminal, with the terminal selecting the base station based on the virtual noise figure for the base station (block 516). Data sent by the terminal at a rate selected based on the actual noise figure for the base station may be received (block 518).

Figure 6:
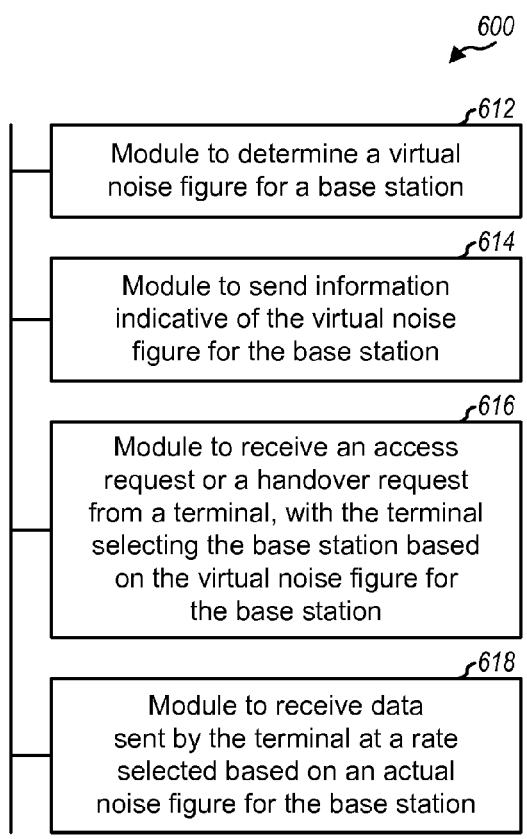
FIG. 6 shows an apparatus for supporting serving base station selection.

FIG. 6 shows a design of an apparatus 600 for supporting serving base station selection. Apparatus 600 includes a module 612 to determine a virtual noise figure for a base station, a module 614 to send information indicative of the virtual noise figure for the base station, a module 616 to receive an access request or a handoff request from a terminal, with the terminal selecting the base station based on the virtual noise figure for the base station, and a module 618 to receive data sent by the terminal at a rate selected based on the actual noise figure for the base station.

FIG. 7 shows a design of a process 700 for performing interference management in a wireless (e.g., heterogeneous) communication network. Process 700 may be performed by a base station or some other entity. A virtual noise figure for a base station may be determined (block 712). A loading parameter (e.g., an IoT or an RoT) indicative of loading at the base station may be determined (block 714). A loading indicator (e.g., an overload indicator) for the base station may be determined based on the loading parameter and the virtual noise figure for the base station (block 716). In one design of block 716, the loading parameter may be compared against a threshold, and the loading indicator may be set based on the comparison result. Either the loading parameter or the threshold may be determined based on the virtual noise figure for the base station. The loading indicator may be transmitted (e.g., broadcast) to terminals, which may adjust their transmit power levels based on the loading indicator (block 718).

FIG. 8 shows a design of an apparatus 800 for performing interference management. Apparatus 800 includes a module 812 to determine a virtual noise figure for a base station, a module 814 to determine a loading parameter indicative of loading at the base station, a module 816 to determine a loading indicator for the base station based on the loading parameter and the virtual noise figure for the base station, and a module 818 to transmit the loading indicator to terminals.

FIG. 9 shows a design of a process 900 for performing power control in a wireless (e.g., heterogeneous) communication network. Process 900 may be performed by a base station or some other entity. A virtual noise figure for a base station may be determined (block 912). Received signal quality (e.g., SNR, CoT or C/I) may be determined for a terminal at the base station (block 914). A power control command may be generated based on the received signal quality and the virtual noise figure (block 916). In one design, a threshold may be determined based on the virtual noise figure, e.g., as shown in equation (18), (19) or (20) (block 914). In another design, the received signal quality may be determined based on the virtual noise figure. For both designs, the received signal quality may be compared against the threshold to determine the power control command. The virtual noise figure may be taken into account in either the received signal quality or the threshold. The power control command may be sent to the terminal, which may adjust its transmit power level accordingly (block 918).

FIG. 10 shows a design of an apparatus 1000 for performing power control. Apparatus 1000 includes a module 1012 to determine a virtual noise figure for a base station, a module 1014 to determine received signal quality for a terminal at the base station, a module 1016 to generate a power control command based on the received signal quality and the virtual noise figure, and a module 1018 to send the power control command to the terminal.

FIG. 11 shows a design of a process 1100 for performing power control in a wireless (e.g., heterogeneous) communication network. Process 1100 may be performed by a terminal or some other entity. The terminal may receive information indicative of a virtual noise figure for a base station (block 1112). This information may comprise any of the information described above. The terminal may determine its transmit power level based on the virtual noise figure for the base station (block 1114). The terminal may receive power control commands from the base station (block 1116) and may adjust its transmit power level based on the power control commands (block 1118).

In one design of block 1114, the terminal may determine an offset based on the virtual noise figure for the base station. The terminal may then set the transmit power level for a first channel based on a second transmit power level for a second channel plus the offset, e.g., as shown in equation (21). The first and second channels may be any of the channels mentioned above. The offset may further include a portion (e.g., a nominal power offset $\Delta_{12}$ between the first and second channels) that may be known to the terminal or sent by the base station to the terminal.

In another design of block 1114, the terminal may determine a change in the virtual noise figure for the base station based on the received information. The terminal may adjust its transmit power level based on the change in the virtual noise figure. For example, the terminal may increase its transmit power level if the virtual noise figure for the base station is degraded, e.g., the change is positive. The terminal may decrease its transmit power level if the virtual noise figure for the base station is improved, e.g., the change is negative.

FIG. 12 shows a design of an apparatus 1200 for performing power control. Apparatus 1200 includes a module 1212 to receive information indicative of a virtual noise figure for a base station, a module 1214 to determine a transmit power level for a terminal based on the virtual noise figure for the base station, a module 1216 to receive power control commands from the base station, and a module 1218 to adjust the transmit power level of the terminal based on the power control commands.

The modules in FIGS. 4, 6, 8, 10 and 12 may comprise processors, electronics devices, hardware devices, electronics components, logical circuits, memories, etc., or any combination thereof.

Figure 13:
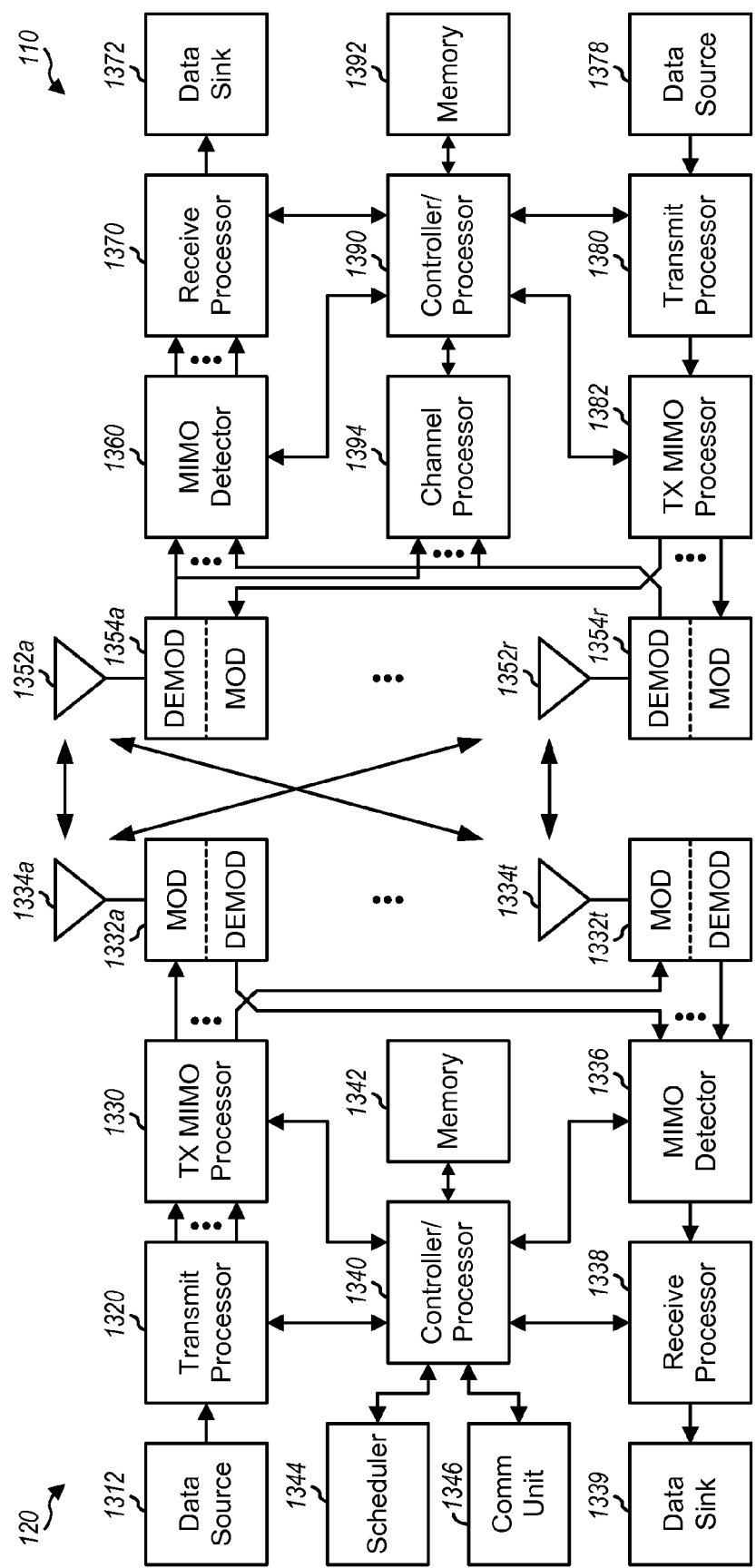
FIG. 13 shows a block diagram of a terminal and a base station.

FIG. 13 shows a block diagram of a design of terminal 110 and base station 120. Base station 122 in FIG. 1 may be implemented in similar manner as base station 120. Base station 120 may be equipped with T antennas 1334a through 1334t, and terminal 110 may be equipped with R antennas 1352a through 1352r, where in general $T \geq 1$ and $R \geq 1$.

At base station 120, a transmit processor 1320 may receive data for one or more terminals from a data source 1312, process (e.g., encode and modulate) the data for each terminal based on one or more modulation and coding schemes, and provide data symbols for all terminals. Transmit processor 1320 may also receive control information (e.g., information for actual and/or virtual noise figures, transmit power level, etc.) from a controller/processor 1340, process the information, and provide control symbols. A transmit (TX) multiple-input multiple-output (MIMO) processor 1330 may multiplex the data symbols, the control symbols, and pilot symbols. Processor 1330 may further process (e.g., precode) the multiplexed symbols and provide T output symbol streams to T modulators (MOD) 1332a through 1332t. Each modulator 1332 may process a respective output symbol stream (e.g., for OFDM, CDMA, etc.) to obtain an output sample stream. Each modulator 1332 may further process (e.g., convert to analog, amplify, filter, and upconvert) the output sample stream to obtain a downlink signal. T downlink signals from modulators 1332a through 1332t may be transmitted via T antennas 1334a through 1334t, respectively.

At terminal 110, R antennas 1352a through 1352r may receive the downlink signals from base station 120 and may provide received signals to demodulators (DEMOD) 1354a through 1354r, respectively. Each demodulator 1354 may condition (e.g., filter, amplify, downconvert, and digitize) a respective received signal to obtain received samples and may further process the received samples (e.g., for OFDM, CDMA, etc.) to obtain received symbols. A MIMO detector 1360 may perform MIMO detection on the received symbols from all R demodulators 1354a through 1354r (if applicable) and provide detected symbols. A receive processor 1370 may process the detected symbols, provide decoded data for terminal 110 to a data sink 1372, and provide decoded control information to a controller/processor 1390.

On the uplink, at terminal 110, data from a data source 1378 and control information (e.g., information identifying a selected serving base station) from controller/processor 1390 may be processed by a transmit processor 1380, precoded by a TX MIMO processor 1382 (if applicable), conditioned by modulators 1354a through 1354r, and transmitted via antennas 1352a through 1352r. At base station 120, the uplink signals from terminal 110 may be received by antennas 1334, conditioned by demodulators 1332, detected by a MIMO detector 1336, and processed by a receive processor 1338 to obtain the data and control information transmitted by terminal 110. A channel processor 1394 may make measurements for parameters (e.g., downlink received signal strength, downlink SNR, uplink SNR, etc.) used for serving base station selection and data transmission.

Controllers/processors 1340 and 1390 may direct the operation at base station 120 and terminal 110, respectively. Controller/processor 1340 and/or other modules at base station 120 may perform or direct process 300 in FIG. 3, process 500 in FIG. 5, process 700 in FIG. 7, process 900 in FIG. 9, and/or other processes for the techniques described herein. Controller/processor 1390 and/or other modules at terminal 110 may perform or direct process 300 in FIG. 3, process 1100 in FIG. 11, and/or other processes for the techniques described herein. Memories 1342 and 1392 may store data and program codes for base station 120 and terminal 110, respectively. A scheduler 1344 may schedule terminals for transmissions on the downlink and/or uplink and may assign resources to the scheduled terminals. A communication (Comm) unit 1346 may support communication with network controller 130 via the backhaul.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving information indicative of a virtual noise figure for each of at least one base station, wherein the information indicative of the virtual noise figure comprises a factor of x, where x is a difference between a virtual transmit power level and an actual transmit power level for each base station or an offset from a noise figure delta for each base station wherein the noise figure delta is a value that is based on a reference transmit power level and the transmit power level for a given base station; and
selecting a serving base station based on the virtual noise figure for each of the at least one base station wherein the noise figure delta is a value that is based on a reference transmit power level and the transmit power level for a given base station.

2. The method of claim 1, wherein the information indicative of the virtual noise figure for each base station comprises the virtual noise figure, a noise figure delta, or a virtual transmit power level for the base station.

3. The method of claim 1, further comprising:
determining an uplink signal-to-noise ratio (SNR) for each of the at least one base station based on the virtual noise figure for the base station, and wherein the selecting the serving base station comprises selecting the serving base station based on the uplink SNR for each of the at least one base station.

4. The method of claim 3, further comprising:
determining a downlink received signal strength for each of the at least one base station, and wherein the selecting the serving base station comprises selecting the serving base station based further on the downlink received signal strength for each of the at least one base station.

5. The method of claim 4, wherein the selecting the serving base station comprises selecting a base station with a highest downlink received signal strength and an uplink SNR above a threshold as the serving base station.

6. The method of claim 4, wherein the selecting the serving base station comprises selecting a base station with a highest uplink SNR and a downlink received signal strength above a threshold as the serving base station.

7. The method of claim 1, further comprising:
receiving information indicative of an actual noise figure for the serving base station;
determining an uplink signal-to-noise ratio (SNR) for the serving base station based on the actual noise figure;
selecting a rate based on the uplink SNR for the serving base station; and
sending data at the selected rate to the serving base station.

8. The method of claim 1, wherein the at least one base station comprises multiple base stations having different transmit power levels.

9. The method of claim 1, wherein the receiving information and the selecting a serving base station are performed by a terminal.

10. The method of claim 1, wherein the receiving information and the selecting a serving base station are performed by one of the at least one base station.

11. An apparatus for wireless communication, comprising:
means for receiving information indicative of a virtual noise figure for each of at least one base station;
means for selecting a serving base station based on the virtual noise figure for each of the at least one base station; and
means for determining an uplink signal-to-noise ratio (SNR) for each of the at least one base station based on the virtual noise figure for the base station, and wherein the means for selecting the serving base station comprises means for selecting the serving base station also based on the uplink SNR for each of the at least one base station.

12. The apparatus of claim 11, further comprising:
means for determining a downlink received signal strength for each of the at least one base station, and wherein the means for selecting the serving base station comprises means for selecting the serving base station based further on the downlink received signal strength for each of the at least one base station.

13. The apparatus of claim 11, further comprising:
means for receiving information indicative of an actual noise figure for the serving base station;
means for determining an uplink signal-to-noise ratio (SNR) for the serving base station based on the actual noise figure;
means for selecting a rate based on the uplink SNR for the serving base station; and
means for sending data at the selected rate to the serving base station.

14. An apparatus for wireless communication, comprising:
at least one processor configured to receive information indicative of a virtual noise figure for each of at least one base station;
to determine an uplink signal-to-noise ratio (SNR) for each of the at least one base station based on the virtual noise figure for the base station; and
to select a serving base station based on the virtual noise figure or the uplink SNR for each of the at least one base station.

15. The apparatus of claim 14, wherein the at least one processor is configured to determine a downlink received signal strength for each of the at least one base station, and to select the serving base station based further on the downlink received signal strength for each of the at least one base station.

16. The apparatus of claim 14, wherein the at least one processor is configured to receive information indicative of an actual noise figure for the serving base station, to determine an uplink signal-to-noise ratio (SNR) for the serving base station based on the actual noise figure, to select a rate based on the uplink SNR for the serving base station, and to send data at the selected rate to the serving base station.

17. A computer program product, comprising: a computer-readable medium comprising:
code for causing at least one computer to receive information indicative of a virtual noise figure for each of at least one base station, wherein the information indicative of the virtual noise figure comprises a factor of x, where x is a difference between a virtual transmit power level and an actual transmit power level for each base station or an offset from a noise figure delta for each base station wherein the noise figure delta is a value that is based on a reference transmit power level and the transmit power level for a given base station, and
code for causing the at least one computer to select a serving base station based on the virtual noise figure for each of the at least one base station.

18. A method for wireless communication, comprising:
sending information indicative of a virtual noise figure for a base station;
determining the virtual noise figure based on a transmit power level for the base station and a reference transmit power level; and
receiving an access request or a handoff request from a terminal, the terminal selecting the base station based on the virtual noise figure for the base station.

19. The method of claim 18, wherein the information indicative of the virtual noise figure for the base station comprises the virtual noise figure, a noise figure delta, or a virtual transmit power level for the base station wherein the noise figure delta is a value that is based on a reference transmit power level and the transmit power level for a given base station.

20. The method of claim 18, wherein the virtual noise figure is determined based further on an actual noise figure for the base station.

21. The method of claim 18, further comprising:
sending information indicative of an actual noise figure for the base station, the actual noise figure being lower than the virtual noise figure; and
receiving data sent by the terminal at a rate selected based on the actual noise figure for the base station.

22. The method of claim 18, further comprising:
sending information indicative of a transmit power level for the base station, wherein the base station is selected based further on the transmit power level.

23. An apparatus for wireless communication, comprising:
means for sending information indicative of a virtual noise figure for a base station;
means for determining the virtual noise figure based on a transmit power level for the base station and a reference transmit power level; and
means for receiving an access request or a handoff request from a terminal, the terminal selecting the base station based on the virtual noise figure for the base station.

24. The apparatus of claim 23, further comprising:
means for sending information indicative of an actual noise figure for the base station, the actual noise figure being lower than the virtual noise figure; and
means for receiving data sent by the terminal at a rate selected based on the actual noise figure for the base station.

25. A method for wireless communication, comprising:
determining a loading parameter indicative of loading at a base station;
determining a loading indicator for the base station based on the loading parameter and a virtual noise figure for the base station; and
transmitting the loading indicator to terminals.

26. The method of claim 25, further comprising:
determining the virtual noise figure based on a transmit power level for the base station and a reference transmit power level.

27. The method of claim 25, wherein the determining the loading parameter comprises determining an interference-over-thermal (IoT) or a rise-over-thermal (RoT) as the loading parameter for the base station.

28. The method of claim 25, wherein the determining the loading indicator comprises
comparing the loading parameter against a threshold, the loading parameter or the threshold being determined based on the virtual noise figure for the base station, and
setting the loading indicator based on comparison result.

29. An apparatus for wireless communication, comprising:
means for determining a loading parameter indicative of loading at a base station;
means for determining a loading indicator for the base station based on the loading parameter and a virtual noise figure for the base station; and
means for transmitting the loading indicator to terminals.

30. The apparatus of claim 29, further comprising:
means for determining the virtual noise figure based on a transmit power level for the base station and a reference transmit power level.

31. The apparatus of claim 29, wherein the means for determining the loading parameter comprises means for determining an interference-over-thermal (IoT) or a rise-over-thermal (RoT) as the loading parameter for the base station.

32. The apparatus of claim 29, wherein the means for determining the loading indicator comprises means for comparing the loading parameter against a threshold, the loading parameter or the threshold being determined based on the virtual noise figure for the base station, and
means for setting the loading indicator based on comparison result.

33. A method for wireless communication, comprising:
determining received signal quality for a terminal at a base station;
determining a virtual noise figure based on a transmit power level for the base station and a reference transmit power level;
generating a power control command based on the received signal quality and the virtual noise figure for the base station; and
sending the power control command to the terminal.

34. The method of claim 33, wherein the determining the received signal quality comprises determining a signal-to-noise ratio (SNR), a carrier-over-thermal (CoT), or a carrier-to-interference ratio (C/I) for the terminal at the base station.

35. An apparatus for wireless communication, comprising:
means for determining received signal quality for a terminal at a base station;
means for determining a virtual noise figure based on a transmit power level for the base station and a reference transmit power level;
means for generating a power control command based on the received signal quality and the virtual noise figure for the base station; and
means for sending the power control command to the terminal.

36. The apparatus of claim 35, wherein the means for determining the received signal quality comprises means for determining a signal-to-noise ratio (SNR), a carrier-over-thermal (CoT), or a carrier-to-interference ratio (C/I) for the terminal at the base station.

37. A method for wireless communication, comprising:
receiving information indicative of a virtual noise figure for a base station;
determining an offset based on the virtual noise figure for the base station; and
setting the transmit power level for a first channel based on a second transmit power level for a second channel and the offset.

38. The method of claim 37, further comprising:
receiving power control commands from the base station, and
adjusting the transmit power level of the terminal based on the power control commands.

39. The method of claim 37, wherein the information indicative of the virtual noise figure for the base station comprises the virtual noise figure for the base station or a change in the virtual noise figure for the base station.

40. The method of claim 37, wherein the determining the transmit power level comprises
determining a change in the virtual noise figure for the base station based on the received information, and
adjusting the transmit power level of the terminal based on the change in the virtual noise figure for the base station.

41. The method of claim 37, wherein the determining the transmit power level comprises
determining a change in the virtual noise figure for the base station based on the received information,
increasing the transmit power level of the terminal if the virtual noise figure for the base station is degraded, and
decreasing the transmit power level of the terminal if the virtual noise figure for the base station is improved.

42. An apparatus for wireless communication, comprising:
means for receiving information indicative of a virtual noise figure for each of at least one base station, wherein the information indicative of the virtual noise figure comprises a factor of x, where x is a difference between a virtual transmit power level and an actual transmit power level for each base station or an offset from a noise figure delta for each base station wherein the noise figure delta is a value that is based on a reference transmit power level and the transmit power level for a given base station; and
means for selecting a serving base station based on the virtual noise figure for each of the at least one base station.

43. An apparatus for wireless communication, comprising:
at least one processor configured to:
receive information indicative of a virtual noise figure for each of at least one base station, wherein the information indicative of the virtual noise figure comprises a factor of x, where x is a difference between a virtual transmit power level and an actual transmit power level for each base station or an offset from a noise figure delta for each base station wherein the noise figure delta is a value that is based on a reference transmit power level and the transmit power level for a given base station; and
select a serving base station based on the virtual noise figure for each of the at least one base station.

44. A method of wireless communication, comprising:
receiving information indicative of a virtual noise figure for each of at least one base station;
selecting a serving base station based on the virtual noise figure for each of the at least one base station; and
determining an uplink signal-to-noise ratio (SNR) for each of the at least one base station based on the virtual noise figure for the base station, and wherein selecting the serving base station comprises selecting the serving base station also based on the uplink SNR for each of the at least one base station.

45. An apparatus for wireless communication, comprising:
at least one processor configured to:
receive information indicative of a virtual noise figure for each of at least one base station;
select a serving base station based on the virtual noise figure for each of the at least one base station; and
determine an uplink signal-to-noise ratio (SNR) for each of the at least one base station based on the virtual noise figure for the base station, and wherein the the processor is further configured to select the serving base station also based on the uplink SNR for each of the at least one base station.

46. A computer program product, comprising:
a computer-readable medium comprising:
code for causing at least one computer to receive information indicative of a virtual noise figure for each of at least one base station;
code for causing the at least one computer to select a serving base station based on the virtual noise figure for each of the at least one base station; and
code for causing the at least one computer to determine an uplink signal-to-noise ratio (SNR) for each of the at least one base station based on the virtual noise figure for the base station, and further comprising code for causing at least one computer to select the serving base station also based on the uplink SNR for each of the at least one base station.

47. A method of wireless communication, comprising:
receiving information indicative of a virtual noise figure for each of at least one base station;
determining an uplink signal-to-noise ratio (SNR) for each of the at least one base station based on the virtual noise figure for the base station; and
selecting a serving base station based on the virtual noise figure or the uplink SNR for each of the at least one base station.

48. An apparatus for wireless communication, comprising:
means for receiving information indicative of a virtual noise figure for each of at least one base station;
means for determining an uplink signal-to-noise ratio (SNR) for each of the at least one base station based on the virtual noise figure for the base station; and
means for selecting a serving base station based on the virtual noise figure or the uplink SNR for each of the at least one base station.

49. A computer program product, comprising:
a computer-readable medium comprising:
code for causing at least one computer to receive information indicative of a virtual noise figure for each of at least one base station;
code for causing the at least one computer to determine an uplink signal-to-noise ratio (SNR) for each of the at least one base station based on the virtual noise figure for the base station; and
code for causing the at least one computer to select a serving base station based on the virtual noise figure or the uplink SNR for each of the at least one base station.

50. A method for wireless communication, comprising:
means for sending information indicative of a virtual noise figure for a base station;
means for determining the virtual noise figure based on a transmit power level for the base station and a reference transmit power level; and
means for receiving an access request or a handoff request from a terminal, the terminal selecting the base station based on the virtual noise figure for the base station.

51. A computer program product, comprising:
a computer-readable medium comprising:
code for causing at least one computer to send information indicative of a virtual noise figure for a base station;
code for causing the at least one computer to determine the virtual noise figure based on a transmit power level for the base station and a reference transmit power level; and
code for causing the at least one computer to receive an access request or a handoff request from a terminal, the terminal selecting the base station based on the virtual noise figure for the base station.

52. An apparatus for wireless communication, comprising:
means for determining a loading parameter indicative of loading at a base station;
means for determining a loading indicator for the base station based on the loading parameter and a virtual noise figure for the base station; and
means for transmitting the loading indicator to terminals.

53. A computer program product, comprising:
a computer-readable medium comprising:
code for causing at least one computer to determine a loading parameter indicative of loading at a base station;
code for causing the at least one computer to determine a loading indicator for the base station based on the loading parameter and a virtual noise figure for the base station; and
code for causing the at least one computer to transmit the loading indicator to terminals.

54. An apparatus for wireless communication, comprising:
means for determining received signal quality for a terminal at a base station;
means for determining a virtual noise figure based on a transmit power level for the base station and a reference transmit power level;
means for generating a power control command based on the received signal quality and the virtual noise figure for the base station; and
means for sending the power control command to the terminal.

55. A computer program product, comprising:
a computer-readable medium comprising:
code for causing at least one computer to determine received signal quality for a terminal at a base station;
code for causing the at least one computer to determine a virtual noise figure based on a transmit power level for the base station and a reference transmit power level;
code for causing the at least one computer to generate a power control command based on the received signal quality and the virtual noise figure for the base station; and
code for causing at least one computer to send the power control command to the terminal.

56. An apparatus for wireless communication, comprising:
means for receiving information indicative of a virtual noise figure for a base station;
means for determining an offset based on the virtual noise figure for the base station; and
means for setting the transmit power level for a first channel based on a second transmit power level for a second channel and the offset.

57. An apparatus for wireless communication, comprising:
at least one processor configured to:
receive information indicative of a virtual noise figure for a base station;
determine an offset based on the virtual noise figure for the base station; and
set the transmit power level for a first channel based on a second transmit power level for a second channel and the offset.

58. A computer program product, comprising:
a computer-readable medium comprising:
code for causing at least one computer to receive information indicative of a virtual noise figure for a base station;
code for causing the at least one computer to determine an offset based on the virtual noise figure for the base station; and
code for causing the at least one computer to set the transmit power level for a first channel based on a second transmit power level for a second channel and the offset.

* * * * *